March 31, 1936.                F. W. LUTZ                2,036,062
                         CAMERA POSITIONING DEVICE
                            Filed July 19, 1935
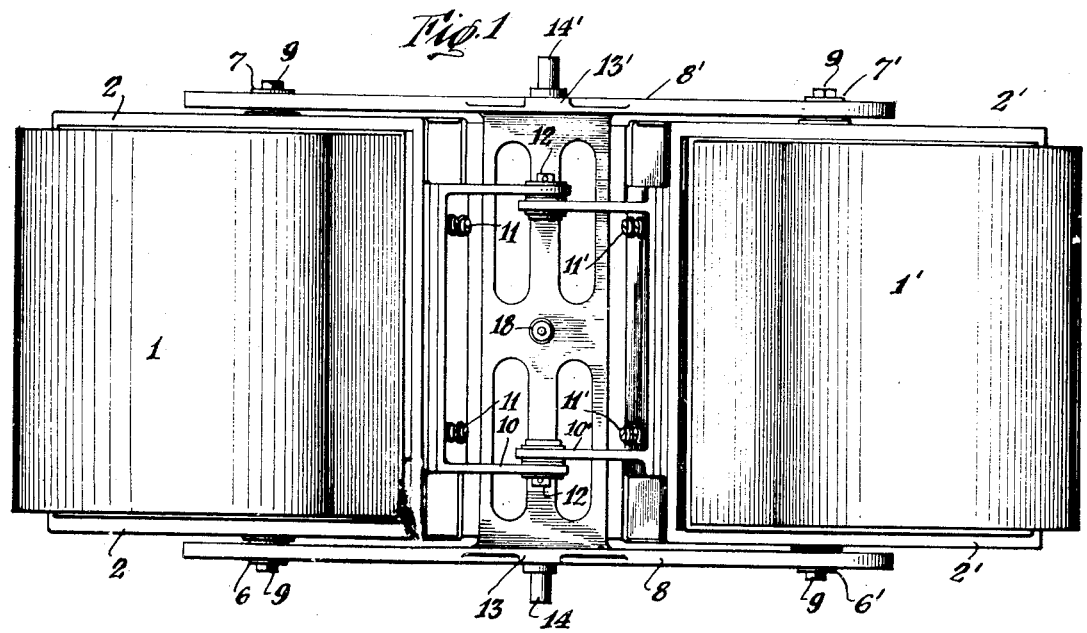
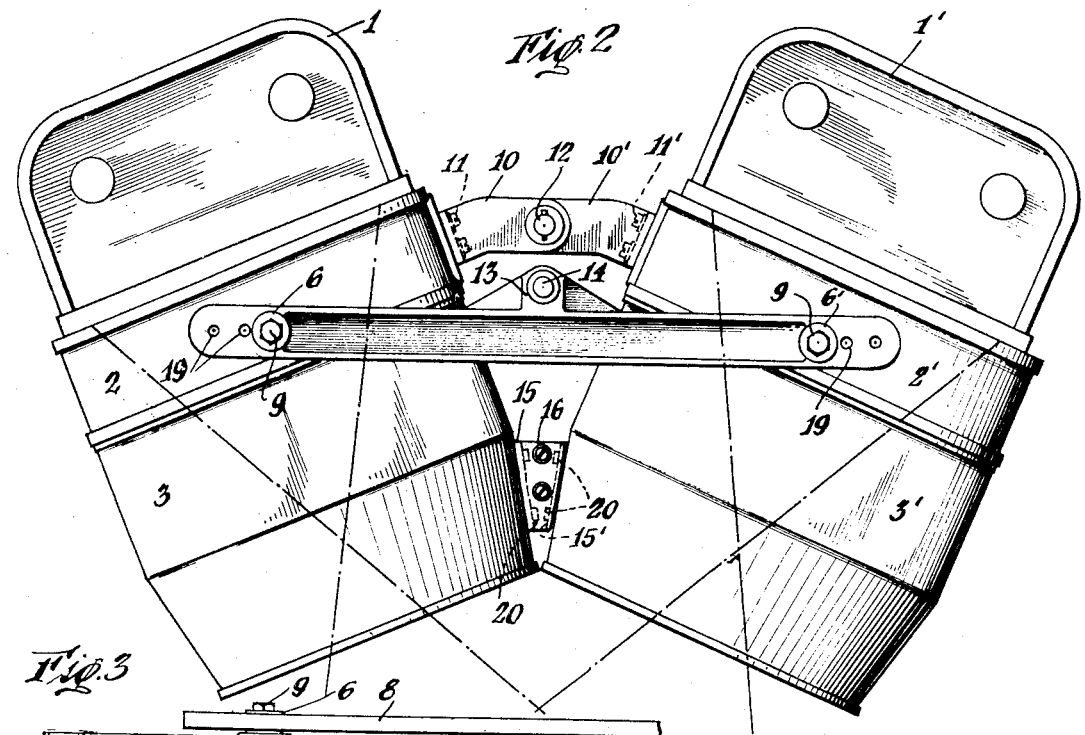
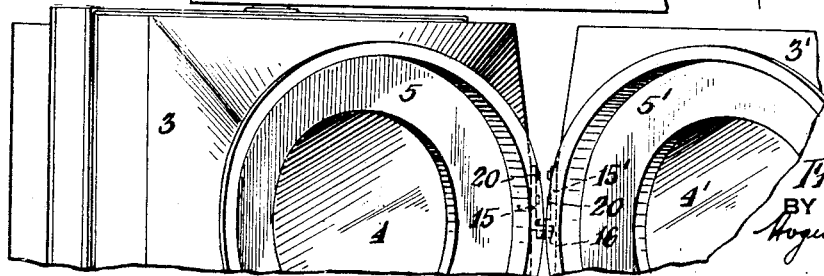
INVENTOR
Frederick W. Lutz
BY
Huguet, Neary & Campbell
ATTORNEYS Patented Mar. 31, 1936

2,036,062

UNITED STATES PATENT OFFICE 2,036,062

CAMERA POSITIONING DEVICE

Frederick W. Lutz, Woodside, N. Y., assignor to Fairchild Aerial Camera Corporation, Woodside, N. Y., a corporation of New York Application July 19, 1935, Serial No. 32,211

13 Claims. (Cl. 95—18)

This invention relates in general to photographic apparatus.

The advantages of using multilens cameras, instead of single lens cameras, in certain types of photographic operations, such as aerial photographic survey or map making, is well recognized. Multilens cameras are, however, usually intricate and expensive and certain operators may prefer to use single lens cameras. There are occasions, however, where it would be of distinct advantage in the absence of a multilens camera, to couple two or more single lens cameras together for certain photographic operations.

The primary reason for using multilens cameras is to obtain a greater coverage with a single exposure and in certain types of photographic operations, such as aerial photographic survey or map making, the use of such cameras reduces the preliminary ground work inasmuch as fewer accurately located control points are necessary. The flying time is thus reduced to a minimum inasmuch as fewer flights are necessary to obtain the desired coverage. Certain operators may have only occasional use for a multilens camera and as they are expensive this occasional use would not justify the purchase and use of such equipment. Then again it may be that the photographic mission on which the operator is sent may not require the use of a multilens camera, or the equipment available may not permit the use of the usual multilens camera. There are occasions, however, when it is of distinct advantage for the operator to be able to couple two or more single lens cameras together for certain photographic operations and thus obtain to a large degree the advantages mentioned above.

In coupling the two or more cameras together, the longitudinal axes of the cameras must have a predetermined known and fixed relationship to the vertical and to each other to provide for a predetermined percentage of overlap of the fields included by the two or more cameras.

A specific application of my principle of invention may well involve the use of aerial cameras, for instance of the well known Fairchild type. In my co-pending application for Interchangeable unit camera, Ser. No. 31,962, filed July 18, 1935, I have emphasized the advantages of and the means for accomplishing the interchangeability of the magazine, case and cone, by employing certain predetermined alignment operations whereby the replacing part will bear the same photographically correct relationship to the remainder of the camera that the replaced part previously assumed.

The present invention preferably involves the use of those principles insofar as concerns the cameras that are to be used. I also propose to carry out a somewhat analogous principle with respect to a simple means for quickly and accurately attaching two or more cameras in a predetermined fixed relationship so that the longitudinal axes thereof bear the desired fixed relationship to the vertical and to one another and so that the optical axes of the two cameras are in the same plane. This will involve certain accurate machining, dowelling or other operations, with respect to the brackets and supporting means for spacing and positioning the cameras so that the brackets and supporting means are readily interchangeable and replaceable and yet retain the desired relationship.

It is therefore an object of the invention to provide a means for proper predetermined alignment of a plurality of photographic units.

Another object is to provide a simple and inexpensive means for accomplishing this alignment.

Another object is to provide such a means whereby a large number of cameras may be readily interchangeable and still bear a definite proper relationship to the vertical and to each other insofar as their longitudinal axes are concerned.

A further object is to provide a combined connecting means for the cameras with means for carrying the connected cameras in a mount.

A further object is to have the positioning and connecting means for the cameras so related that different cones with lenses of various focal lengths may be used with the cases and the means for joining the cameras will automatically fix the cameras at the proper angles to secure the desired overlap.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in top plan of a pair of cameras joined together by a camera positioning device.

Figure 2 is a view in side elevation of the same.

Figure 3 is a fragmentary bottom plan view of the same.

Referring more particularly to the drawing, I have shown two cameras joined together by my positioning device, it being understood that I may similarly join two or more cameras if desired.

The two cameras shown comprise magazines 1 and 1', cases 2 and 2', lens cones 3 and 3', lenses 4 and 4', and lens cases 5 and 5'.

In utilizing the principles outlined in my aforesaid co-pending application with respect to interchangeability of parts over a large series, I assume the two or more complete cameras to be substantially identical with respect to the positioning of their respective parts including their lenses. Preferably I propose to position the two cameras with respect to their longitudinal axes so that I may obtain a predetermined relative proportion of overlap of the two or more fields included by the cameras. The camera cases and cones are so accurately machined and provisions made for attaching the required coupling means that the means will be predeterminedly properly positioned with respect to the cone and case.

The next step is to provide a hinged connection between the two cameras. This may involve the use of brackets 10 secured by bolts 11 to the case 2 and brackets 10' secured by bolts 11' to the case 2'. These brackets are predetermined as to their length and relative location with respect to the longitudinal axes of the cameras and the common hinge member 12. This connection fixes the two cameras against relative movement except in one plane, the connections being flexible to permit relative pivotal movement in that one plane. The brackets 10 and 10' are preferably doweled to their respective cases and are thus rendered interchangeable.

I may then utilize the trunnions 6 and 7 of the case 2 and trunnions 6' and 7' of the case 2' that are normally used for mounting the respective cameras singly, and employ rigid supporting bars 8 and 8' between the trunnions 6 and 6' and 7 and 7' respectively. These trunnions are accurately located so as to be at the center of gravity of the corresponding camera and on the axis of the camera at right angles to the brackets 10 and 10'. The supporting bars are doweled with the respective trunnions and subsequently fastened together by such means as bolts 9 or the like. In order to use the same supporting bars for different length cones I may dowel the bars with several spaced dowel holes 19 accordingly as the length of the cone is varied. The bars may be used as a supporting means or as spacing and positioning means or both. The bars, being doweled with respect to the trunnions, are interchangeable throughout a series of cameras. Secured to or integral with the bars 8 and 8' are flanges 13 and 13' in which are fitted trunnions 14 and 14' respectively for purposes of mounting the joined cameras. The trunnions 14 and 14' are positioned vertically above or below the center of the hinge element 12 of the brackets 10 and 10'.

In the event that bars 8 and 8' are used as supporting means only, other means must be provided for spacing and positioning the cameras which may be accomplished by releasably joining their cones. Doweled and fastened to the cone 3 by means of bolts 20 is a bracket 15 of predetermined size and shape. Similarly secured to the cone 3' is a bracket 15' of identical size and shape as the bracket 15. The camers are rotated about as the bracket 15. The camers are rotated about the hinge axis 12 until it is determined that the longitudinal axes of the cameras bear the proper angular relationship to the vertical and to each other for the proper photographic overlap. The brackets 15 and 15' are staggered and overlap in adjacent relationship. They are then doweled and fastened together by means of bolts 16 or the like. Having been thus doweled the brackets are interchangeable, but more important the cameras, by reason of the doweling of the hinge and hinge brackets and also the supporting bars, are readily interchangeable in their entirety or with respect to their parts over an entire series.

In the event that longer or shorter cones than those represented in the drawing are used, it may be necessary to provide brackets of correspondingly varying lengths from those shown at 15 and 15'. However, this adds no material difficulty in carrying out the scheme of interchangeability of cameras and camera parts. If necessary I may provide the brackets 15 and 15' with several dowel holes, as I have done in the supporting bars 8 and 8', for rendering these brackets useable with different length cones.

In keeping with the well known Fairchild principle of camera suspension in the camera mounts so that the plane of suspension is through the center of gravity, the same is true of the present arrangement so that when the trunnions 14 and 14' are secured in the mount, the cameras will be universally but not pendulously suspended. A simple spirit level 18 enables the operator to assure the level disposition of the cameras while manually holding them during the exposure operation.

From the foregoing it will be seen that in addition to interchangeability of camera parts I have provided for interchangeability of cameras in a novel and advantageous positioning device for a plurality of cameras, by the simultaneous use of which I may obtain the resulting photographic benefits usually obtainable only by the use of multilens cameras. The whole arrangement likewise adheres, in spite of the interchangeable feature, strictly to the line of utmost precision required in certain types of photographic operations. The arrangement provides for simple operation and replacement as well as for accessibility and practicability in field operations.

I claim:

1. In combination, a plurality of complete cameras, means for providing and maintaining a predetermined alignment between said cameras with respect to the longitudinal axes thereof and for predetermining the percentage of the photographic overlap of the fields included by the photographic objectives of said cameras, said means including releasable and interchangeable hinge units of predetermined dimensions connecting said cameras and limiting the relative movement of said cameras to a movement in one plane, interlocking brackets with predeterminedly located fastening devices for releasably connecting said cameras in said relationship for predetermining the percentage of the photographic overlap, and supporting bars intermediate said brackets and hinges and of predetermined length for supporting said cameras in said predetermined relationship.

2. In combination, a plurality of complete cameras, means for providing and maintaining a predetermined alignment between said cameras with respect to the longitudinal axes thereof and for predetermining the percentage of the photographic overlap of the fields included by the photographic objectives of said cameras, said means being releasable to allow for interchangeability of cameras previously similarly aligned with respect to said means for maintaining said alignment, said means including releasable and interchangeable hinge units of predetermined dimensions connecting said cameras and limiting the relative movement of said cameras to a movement in one plane, interlocking brackets with predeterminedly located fastening devices for releasably connecting said cameras in said relationship for predetermining the percentage of the photographic overlap and supporting bars intermediate said brackets and hinges and of predetermined length for supporting said cameras in said predetermined relationship.

3. In combination, a plurality of cameras, means for releasably and flexibly connecting said cameras in a predetermined plane with respect to their longitudinal axes and to limit the relative movement of said cameras to a movement in said plane, and means for angularly disposing said cameras in said plane at a predetermined angle to each other and to the vertical so as to provide for a predetermined percentage of angular overlap of the useful fields included by the photographic objectives of said cameras.

4. In combination, a plurality of complete cameras, means for releasably and flexibly connecting said cameras in a predetermined plane with respect to their longitudinal axes and to limit the relative movement of said cameras to a movement in said plane, and means for angularly disposing said cameras in said plane at a predetermined angle to each other and to the vertical and for supporting said cameras in a mount in said relationship so as to provide for a constant predetermined percentage of angular overlap of the useful fields included by the photographic objectives of said cameras.

5. In combination, a plurality of cameras, means for flexibly connecting said cameras in a predetermined plane with respect to their longitudinal axes and to limit the relative movement of said cameras to a movement in said plane, and means for angularly disposing said cameras in said plane at a predetermined angle to each other and to the vertical and for supporting said cameras in a mount in said relationship so as to provide for a constant predetermined percentage of angular overlap of the useful fields included by the photographic objectives of said cameras, said means being releasable so as to provide for the interchangeability of said means with cameras previously similarly aligned.

6. In combination, a plurality of complete cameras, means for releasably and adjustably maintaining a predetermined alignment of said cameras with respect to each other and to the vertical so as to provide for a constant predetermined percentage of angular overlap of the useful fields included by the photographic objectives of said cameras, said means including a plurality of relatively adjustable parts that are adjustable either jointly or separately for effecting the adjustments of said camera.

7. In combination, a plurality of cameras, means for maintaining a predetermined alignment between said cameras with respect to their longitudinal axes and to each other, means for predeterminedly angularly disposing said cameras so as to provide for a constant percentage of angular overlap of the useful fields included by the photographic objectives of said cameras and for supporting said cameras in a mount in said relationship, said means including releasable and interchangeable hinge units of predetermined dimensions connecting said cameras and limiting the relative movement of said cameras to a movement in one plane, including releasable and interchangeable spacing bars adapted to provide for a plurality of said angular adjustments over a series of said cameras, said spacing bars being provided with trunnions for supporting said cameras in said mount in said predetermined relationship.

8. In combination, a plurality of cameras, means for maintaining a predetermined alignment between said cameras with respect to their longitudinal axes and to each other, means for predeterminedly angularly disposing said cameras so as to provide for a constant percentage of angular overlap of the useful fields included by the photographic objectives of said cameras and for supporting said cameras in a mount in said relationship, said means including releasable and interchangeable hinge units of predetermined dimensions connecting said cameras and limiting the relative movement of said cameras to a movement in one plane, interlocking brackets with a plurality of predeterminedly located fastening devices for releasably connecting said cameras in said predetermined angular relationship, and supporting bars intermediate said brackets and hinges for supporting said cameras in a mount in said predetermined relationship.

9. In combination, a plurality of cameras, means for maintaining a predetermined alignment between said cameras with respect to their longitudinal axes and to each other, means for predeterminedly angularly disposing said cameras so as to provide for a constant percentage of angular overlap of the useful fields included by the photographic objectives of said cameras and for supporting said cameras in a mount in said relationship, said means being releasable to allow for interchangeability of cameras previously similarly aligned with respect to said means for maintaining said alignment, said means including releasable and interchangeable hinge units of predetermined dimensions connecting said cameras and limiting the relative movement of said cameras to a movement in one plane, and including releasable and interchangeable spacing bars adapted to provide for a plurality of said angular adjustments of said cameras, said spacing bars being provided with trunnions for supporting said cameras in said mount in said predetermined relationship.

10. In combination, a plurality of complete cameras, means for providing and releasably maintaining a predetermined alignment of said cameras in a predetermined plane with respect to their longitudinal axes and for releasably and adjustably predeterminedly aligning said cameras with respect to each other and to the vertical so as to provide for a constant predetermined percentage of angular overlap of the useful fields included by the photographic objectives of said cameras.

11. In combination, a plurality of cameras said cameras comprising a plurality of interchangeable usable magazines, cases and cones, means for releasably and flexibly connecting said interchangeable magazines, cases and cones of said cameras in a predetermined plane with respect to their longitudinal axes and to limit the relative movement of said cameras to a movement in said plane, and means for angularly disposing said cameras in said plane at a predetermined angle to each other and to the vertical and for supporting said cameras in a mount in said relationship so as to provide for and maintain a predetermined percentage of angular overlap of the useful fields included by the photographic objectives of said cameras.

12. In combination, a plurality of cameras, means for providing and releasably and adjustably maintaining a predetermined alignment between said cameras with respect to each other and to the vertical so as to provide for a predetermined overlap of the fields to be included by the photographic objectives of said cameras.

13. In combination, a plurality of cameras, means for providing and maintaining a predetermined alignment over a series of said termined alignment between said cameras with respect to each other and to the vertical so as to provide for a predetermined overlap of the fields to be included by the photographic objectives of said cameras and for supporting said cameras in a mount in said relationship, said means including releasable and interchangeable hinge units of predetermined dimensions connecting said cameras, and including releasable and adjustable and interchangeable spacing bars adapted to provide for a plurality of said predetermined alignments over a series of said cameras, said spacing bars being provided with trunnions for supporting said cameras in said mount in said predetermined relationship.

F. W. LUTZ.